March 27, 1956 J. F. CHAPMAN ET AL 2,739,411
INSECT EJECTOR APPARATUS
Filed Nov. 12, 1954 2 Sheets-Sheet 1
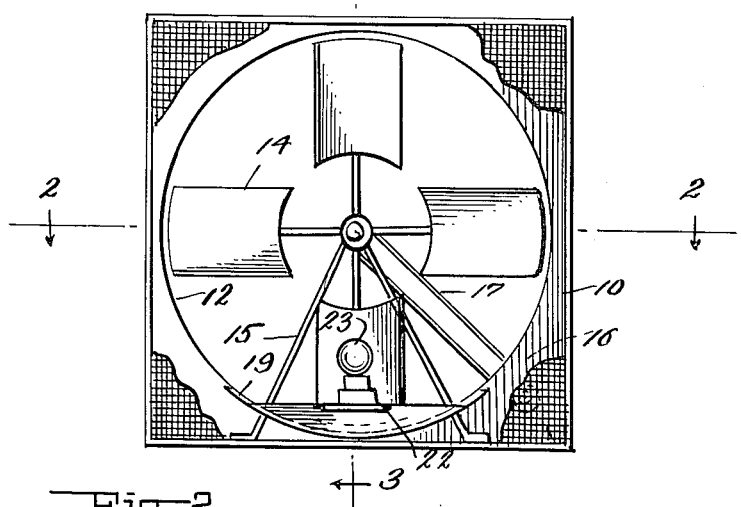
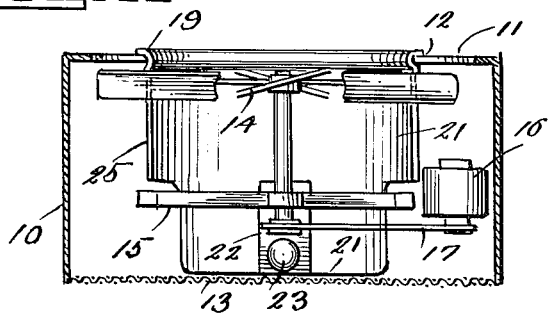
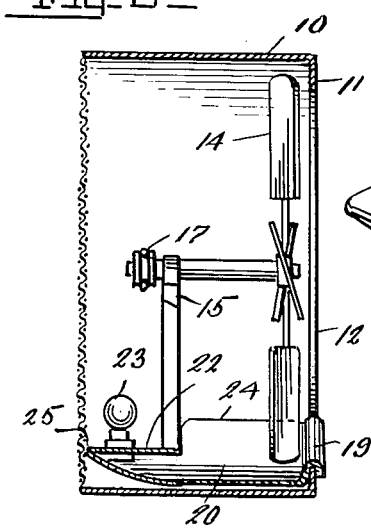
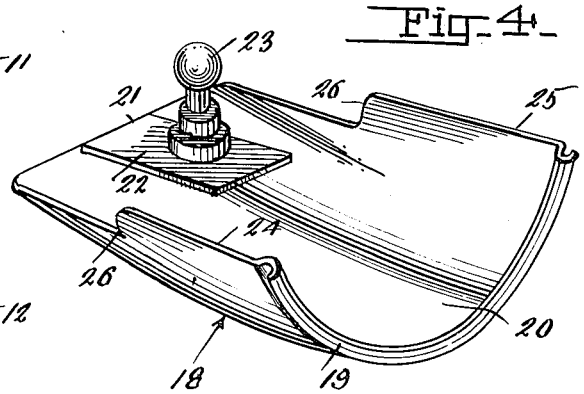
INVENTORS
JOHN F. CHAPMAN
BY HARRY Y. CHAPMAN
Patrick D. Beaver
ATTORNEY

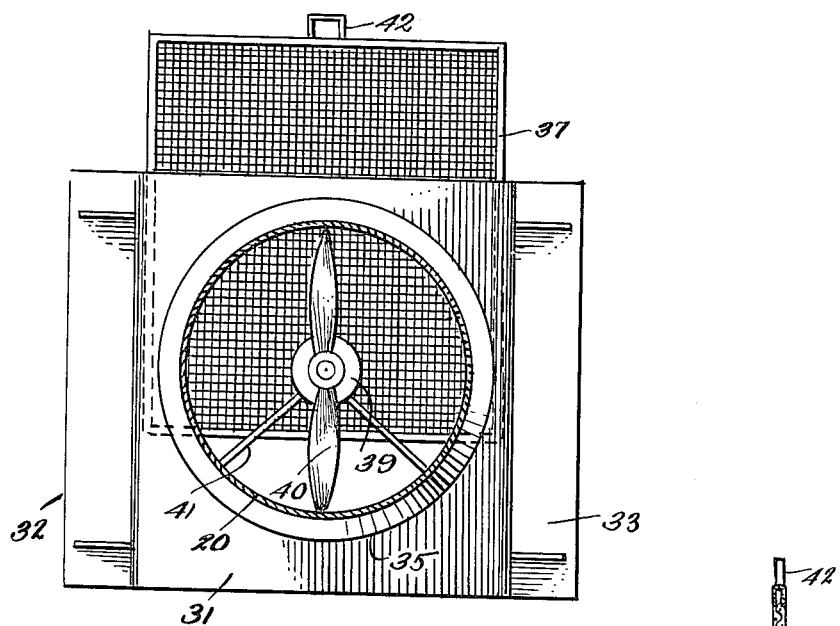
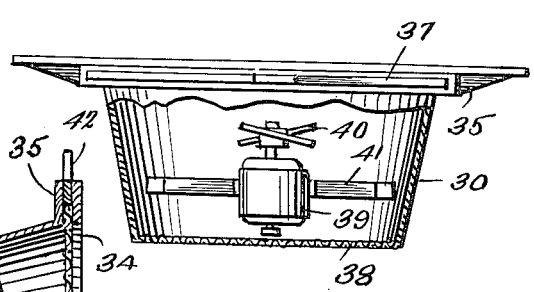
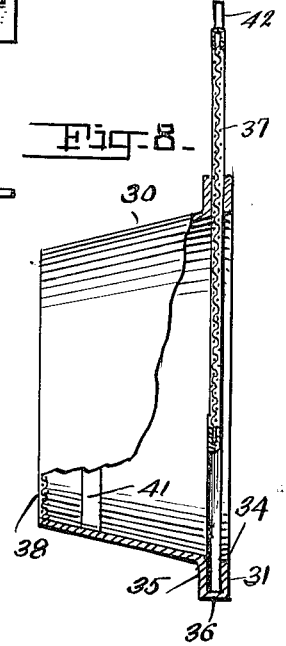
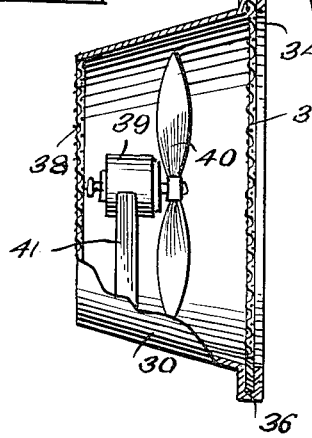
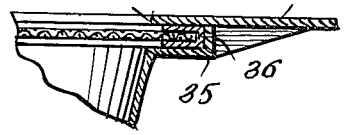

United States Patent Office 2,739,411
Patented Mar. 27, 1956

2,739,411

INSECT EJECTOR APPARATUS

John F. Chapman and Harry Y. Chapman, Creve Coeur, Mo.

Application November 12, 1954, Serial No. 482,261

4 Claims. (Cl. 43—139)

This invention relates to improvements in apparatus that is especially designed to eject insects of various types from the rooms or buildings in which the same is installed.

It is a well-known fact that insects are attracted by lights, and an important object of the present invention is to provide an apparatus that will include some means of illumination that will attract insects.

Another object of the invention is to provide an apparatus that will include a suction type rotary fan so that when the insects are attracted by the lights the fan will draw the insects into the apparatus and eject them through an open window.

In use all other forms of illumination, besides the one incorporated in the apparatus, is extinguished and with the only available illumination positioned at the location of the apparatus the rooms and buildings will soon be free of all types of flying insects.

A further object of the invention is to provide an apparatus of this type which, in addition to the use of illumination to attract the insects, will also have means incorporated therein to hold fluids that have well-known attractive qualities for insects.

With the above and other objects and advantages in view the invention consists of the novel details of construction, arrangement and combination of parts more fully hereinafter described, claimed and illustrated in the accompanying drawings in which:

Fig. 1 is a front elevational view, partly broken away, of one form of apparatus embodying the invention;

Fig. 2 is a transverse sectional view on the line 2—2 of Fig. 1;

Fig. 3 is a vertical sectional view on the line 3—3 of Fig. 1;

Fig. 4 is a perspective view of an ejector tray used in the apparatus embodying the invention;

Fig. 5 is a front elevational view of another form of apparatus embodying the invention;

Fig. 6 is a top plan view, partly in section, of Fig. 5;

Fig. 7 is a detailed sectional view, partly broken away, with the screen in closed position;

Fig. 8 is a detailed sectional view, partly broken away, similar to Fig. 7 with the screen in partially raised position; and Fig. 9 is a detailed fragmentary sectional view of a portion of the guideway for the screen.

Referring more in detail to the drawings and more especially to Figs. 1 to 4 inclusive, wherein like parts are designated by like reference numerals the form of the invention disclosed in these figures includes a fan housing 10 which may be of any shape or size, but for purposes of illustration is shown to be of rectangular formation.

The front 11 for the housing 10 is provided with a circular vent opening 12 and the rear of the housing 10 is closed by a grille guard 13.

A rotary fan 14 is journalled on a support 15 within the housing 10 and is driven by means of an electric motor 16 through the medium of a belt drive 17. The fan 14 may be of any size or shape and be equipped with any number of blades, but for the purpose of illustration a four bladed fan is disclosed.

Mounted within the housing 10 is a semi-circular ejector tray 18, as shown in Fig. 4. The forward edge of the tray 18 is provided with a semi-circular flange 19 which conforms to the vent opening 12 and is positioned over the edge thereof, as shown in Figs. 2 and 3.

The tray 18 is curved so that the blades of the fan 14 may rotate without striking the tray and the bottom 20 of the tray inclines upwardly from the forward flanged end 19.

The rear edge 21 of the tray is straight and a bracket 22 extends forwardly therefrom at right angles thereto. The bracket 22 is used to support a form of illumination 23.

The illumination may be an incandescent bulb as shown, or a fluorescent lamp, whichever may be desired. Power for energizing the bulb or lamp may be by means of a separate electric cord or it may be incorporated with the power line to the motor 16.

The tray 18 is provided with oppositely disposed wings 24 and 25 which at their front edges are contiguous with the flange 19, but at their rear edges are inset as at 26 to merge with that portion of the bottom 20 of the tray 18 that is contiguous with the rear edge 21 thereof.

The bottom 20 of the tray 18 follows the contour of a scoop so that as the insects are attracted to the apparatus by the illumination, the fan will draw the insects into the tray and then eject them outwardly of the tray. The inclination of the tray insures that all dead insects will be ejected from the tray at all times.

The tray can be made of any size and can be incorporated in fan housings that are not supplied with the tray at the time of production.

Solutions or pellets for attracting the insects may be used with the tray so that the apparatus will be as effective in the day time as in the night time when the illumination is used.

In Figs. 5 to 9 inclusive another form of apparatus, with which the tray 18 may be used (or omitted), is shown to include a circular housing 30 having a rectangular shaped panel 31 for the front thereof. The panel front 31 is provided at its vertical side edges with spacing panels 32 and 33, respectively.

The panel front 31 is provided with a circular opening 34 and an annular flange 35 on the forward edge of the housing 30 provides a guideway 36 for a screen 37.

The screen 37 is provided with a center handle or lift latch 42, which when turned a quarter turn, latches or unlatches the screen 37 to or from the sash making its action automatic with or independant of sash action.

The housing 30 is provided at its rear with a circular grille 38 and an electric motor 39, having a two bladed fan 40 rotated thereby, is mounted on a support 41 within the housing 30.

If the housing is mounted in a window, the screen 37 will prevent insects from entering the room in which the housing is installed.

The tray 18 will fit in the housing 30 in the same manner as previously described with regard to the housing 10, or if the tray is omitted, the housing 30 serves as a tray and in this case the form of illumination, light 23 and bracket 22 are mounted on the grill guard or in the fan housing.

In use the housings may be placed near the window or in the window. Ventilating fans being of either form and when the illumination is on, insects will be attracted to the fan housing and drawn into the fan housing by the suction of the fan.

When the fan is in operation insects will be quickly cleared from the room in which the fan is installed.

The apparatus is designed to be used either in the day time or at night time by reason of the solutions or pellets that are used to attract the insects.

It is believed that the operation and construction of the apparatus embodying the invention will be clear to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. An apparatus of the type described comprising a fan housing, a rotary fan in said housing, a tray in said housing at the bottom thereof and illuminating means mounted on said tray to attract insects to said housing so that they will be drawn into said housing and ejected therefrom by said fan.

2. An apparatus as in claim 1, wherein said housing is provided with a vent opening and said tray is provided with a flange to engage said opening to hold said tray in fixed relation to said housing.

3. A tray for a ventilating fan having a forward edge of arcuate formation and a straight rear edge, a bottom inclined downwardly from the rear edge to the forward edge, a flange on the forward edge for mounting the tray in a housing and a bracket extending from the rear edge for mounting illuminating means on said tray.

4. A tray as in claim 3, wherein wings are provided on the opposite sides thereof that are contiguous with the flange at their forward edges and are inset at their rear edges to be contiguous with the rear of said tray.

References Cited in the file of this patent

UNITED STATES PATENTS

| | | |
|---|---|---|
| 738,184 | Goodwin | Sept. 8, 1903 |
| 959,155 | Nault | May 24, 1910 |
| 1,484,369 | Andreucci | Feb. 19, 1924 |
| 1,497,540 | Bowen | June 10, 1924 |